Feb. 20, 1962 T. E. BLOCKSOM 3,021,983
LIQUID DISPENSING ATTACHMENT FOR LAWN MOWERS
Filed Jan. 27, 1959 2 Sheets—Sheet 1

Thomas E. Blocksom
INVENTOR.

BY Clarence A. O'Brien
and Harvey B. Jacobson
Attorneys

Feb. 20, 1962 T. E. BLOCKSOM 3,021,983
LIQUID DISPENSING ATTACHMENT FOR LAWN MOWERS
Filed Jan. 27, 1959 2 Sheets-Sheet 2
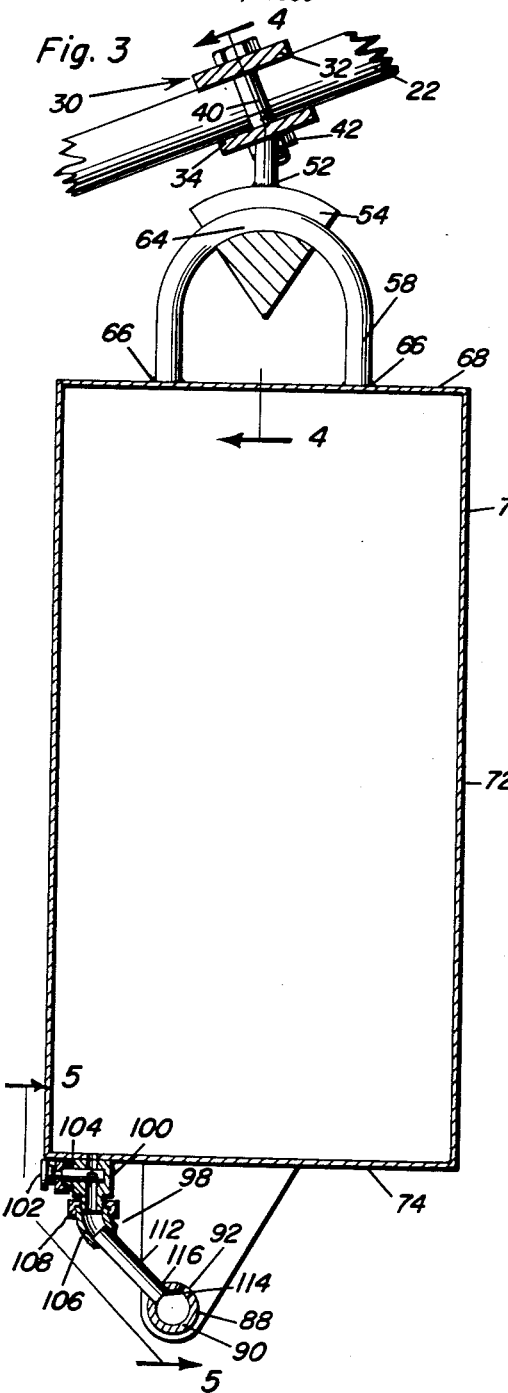
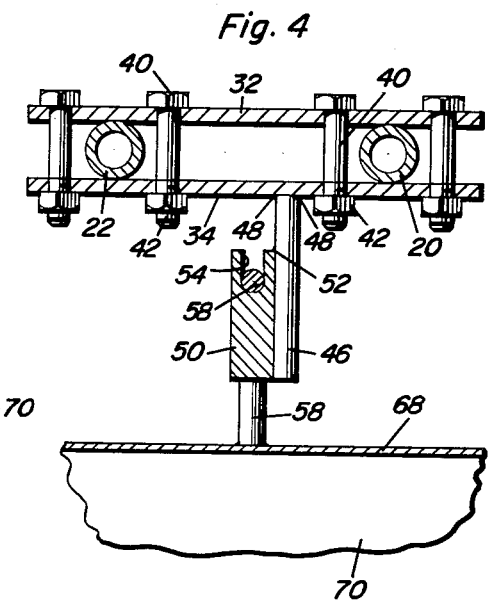
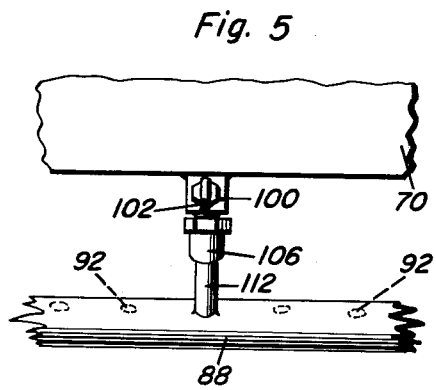
Thomas E. Blocksom
INVENTOR.

United States Patent Office 3,021,983
Patented Feb. 20, 1962

3,021,983
LIQUID DISPENSING ATTACHMENT FOR LAWN MOWERS
Thomas E. Blocksom, 894 Oak Grove Ave., Marion, Ohio
Filed Jan. 27, 1959, Ser. No. 789,318
4 Claims. (Cl. 222—191)

This invention relates to lawn mowers and more particularly to dispensing attachments for lawn mowers.

An object of the invention is to provide a practical, inexpensive liquid dispenser for a power or manual lawn mower. The liquid dispensed from the dispenser may be of several types including fertilizers, weed killers and others.

The attachment may be connected to and used with all conventional lawn mowers for home or commercial use. While the attachment is moved with the mower over the lawn, the lawn is automatically supplied with a metered amount of liquid and in the swath cut by the lawn mower.

As previously indicated manual types of lawn mowers may be used, that is, the lawn mowers which have only the reel or blade power operated or which rely wholly on manual operation.

The dispenser is practical because it serves its intended dispensing operation effectively and also because it is mechanically simple in construction. Mechanical simplicity is emphasized since the cost of production may be maintained low so that a product that is the dispenser, may be produced at a reasonable, commercially acceptable cost. More complex dispensers relying on pump pressure serve the purpose intended by this invention no better than the gravity feed dispenser disclosed herein but require a considerably greater initial cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged sectional view taken approximately on the line 3—3 of FIGURE 1.

FIGURE 4 is an enlarged sectional view taken approximately on the line 4—4 of FIGURE 3.

FIGURE 5 is an enlarged fragmentary elevational view showing the valve construction when viewed along the plane of line 5—5 of FIGURE 3.

Figure 1:
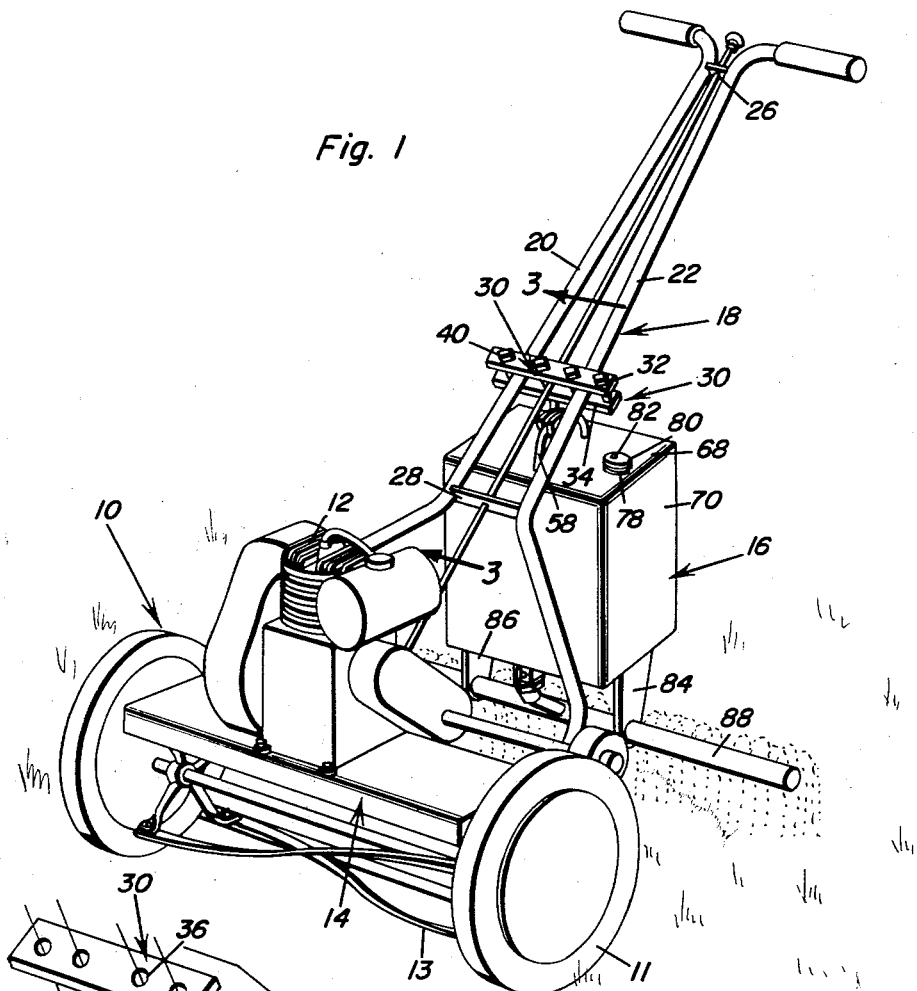
FIGURE 1 is a perspective view of a lawn mower equipped with a dispenser in accordance with this invention.
Figure 2:
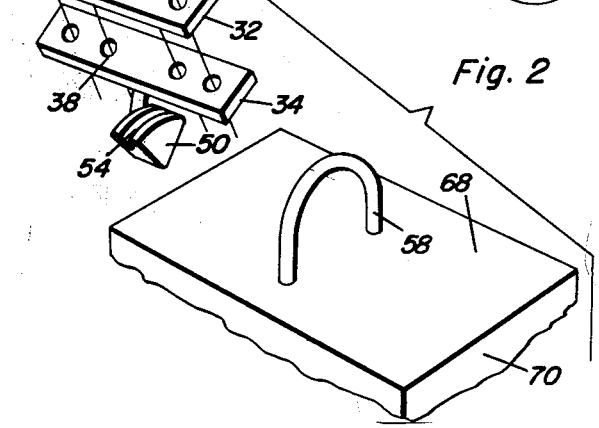
FIGURE 2 is a fragmentary enlarged exploded perspective view showing principally the clamp for the dispenser, the clamp being in the nature of an articulated hanger for the dispenser tank.

In the accompanying drawings there is a conventional lawn mower 10. This lawn mower is a reel type lawn mower, and the lawn mower is propelled by the power components of engine 12 attached to the frame 14 of the lawn mower 10. Since the lawn mower is absolutely conventional a further description of the lawn mower mechanism is unnecessary. However, it is to be understood that the lawn mower 10 merely diagrammatically represents any type of lawn mower with which dispenser 16 is operable. The dispenser functions as a distributor for liquid substance, regardless of the nature of the substance, and the only mechanical part of the lawn mower with which the dispenser is connected, is handle 18. The illustrated handle has two sides 20 and 22 joined by transverse braces 26 and 28. Clamp 30 is attached to handle 18 and is composed of a pair of flat, upper and lower bars or plates 32 and 34 having a plurality of apertures 36 in plate 32 and a plurality of apertures 38 in plate 34. The plates, when assembled on handle 18, fit above and below respectively (FIGURE 4) the sides 20 and 22 of the handle. Bolts 40 having nuts 42 thereon, are extended through the apertures in plates 32 and 34 and are used to tighten and hold the plates 32 and 34 in a selected fixed position on handle 18.

A depending rod 46 is welded, for example by welds 48, to the plate 34 and has a vertical segment or saddle member 50 secured thereto in side-abutting engagement therewith by welds 52. The saddle member has an upwardly opening groove 54 that forms a saddle within which the approximately U-shaped hook, bail or yoke 58 is seated. The hook, being circular in cross-section, is capable of shifting laterally that is, from left to right as viewed in FIGURE 4, and is also capable of shifting forward and rearward that is, from left to right as shown in FIGURE 3. The forward and rearward motion is possible because the hook 58 has an arcuate upper part 64, and the bottom surface of the saddle is also arcuate.

Hook 58 is fixed, for example by welds 66 to the upper wall 68 of tank 70. The tank has side walls 72 and a bottom wall 74 all joined together to form the rectangular (in cross-section) tank, although other shapes may be adopted. A filler neck 78 is attached to the top wall 68 of tank 70, and a filler cap 80 having an air vent 82, is separably attached to neck 78 in order to fill the tank 70.

Two depending brackets 84 and 86 are fixed to the bottom wall 74 of the tank, and these have lower apertures 88 through which dispensing tube 90 extends. The dispensing tube has closed ends and a plurality of spaced orifices 92 along the length thereof, these spaced orifices being in the wall of tube 88. It is preferred that the orifices be arranged to discharge upwardly and rearwardly with reference to the normal forward path of movement of the lawn mower 10.

There is means 98 for conducting liquid from the bottom of tank 70 to the dispensing tube 88. This means consists of valve 100 having a valve operating handle 102, and secured, as by welds 104 to the bottom 74 of tank 70. Pipe fitting 106 is attached to the discharge end 108 of valve 100 and to a short length of conduit 112. The lower extremity of the conduit is registered with the interior of dispensing tube 88, for example, by being fitted in a hole 114 in the center of the dispensing tube and held in place by weld 116.

In use and operation, after mounting the dispenser 16 on the lawn mower so that it is located behind the lawn mower wheels 11 and reel 13 thereof, valve 100 is opened to the desired setting depending on the rate of flow through orifices 92 which is desired. Liquid is then capable of flowing by gravity from tank 70 through means 98 into tube 88. Due to the hydrostatic pressure of the liquid in tank 70, and the conducting means 98, the liquid is discharged through the orifices 92 in an upward and rearward flow pattern (see FIGURE 1) and directly on the swath cut by the lawn mower 10. Therefore, in mowing the lawn or any other area, the person is able, with the dispenser 16 attached to the lawn mower 10, to fertilize, apply weed killer or any other substance which he desires. It is evident that one complete operation on a lawn has a considerable part of the labor and effort involved reduced. Further, the articulated clamp and the structural nature of the clamp makes it possible to do two things. The first is to have the dispenser remain level by gravity at all times regardless of the angularity of the lawn mower. Thus, the liquid is prevented from gravitating to either end of the tube 88 and a uniform discharge throughout the length of said tube is maintained. Locating the orifices 92 in the upper portion only of the tube 88 also assists in preventing unequal discharge as the end portions of said tube must fill up before the liquid will flow therefrom. Still further, with the orifices 92 in the upper portion of the tube, clogging of said orifices by sediment settling in the lower portion of said tube is avoided. The articulated feature of the clamp achieves this result among others which will become evident to those skilled in the art. The adjustable nature of the clamp enables the dispenser 16 to be placed anywhere along the length of handle 18 thereby adjusting the elevation of dispenser tube 88 from the ground. Further, it enables a person to attach the distributor 16 to various manufacturers' makes of lawn mower handles where the type of handle used is varied, and the diameter of the handle is varied and other variable factors exist.

An important feature of the attachment is found in the ease of packaging and shipping. The dispenser tube assembly is demountable from the container by simply disconnecting the nut at the control valve, slipping to one side out of the bracket 84 then in an opposite direction until free from depending bracket 86. With this feature no special container for shipping is required, and further the attachment may be placed in a smaller container.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fluid spraying attachment for lawn mowers of the type including a rearwardly and upwardly inclined, elongated handle, said attachment comprising a tank for receiving a fluid to be sprayed, brackets fixed to said tank, a horizontal tube fixedly mounted on said brackets transversely beneath the tank and communicating therewith for receiving the fluid therefrom, said tube having discharge orifices in the upper portion only thereof, and means for non-rotatably suspending the tank from the handle for forward, rearward and lateral swinging movement, said means including a peripherally grooved segment depending from the handle and a bail on the tank operable in said segment.

2. A fluid spraying attachment for lawn mowers of the type including a rearwardly and upwardly inclined, elongated handle, said attachment comprising a tank for receiving a fluid to be sprayed, brackets fixed to said tank, a horizontal tube fixedly mounted on said brackets transversely beneath the tank and communicating therewith for receiving the fluid therefrom, said tube having discharge orifices in the upper portion only thereof, and means for non-rotatably suspending the tank from the handle for forward, rearward and lateral swinging movement, said means comprising a clamp mounted on the handle, a peripherally grooved segment mounted on said clamp, and an upstanding yoke on the tank operable in the segment.

3. A fluid spraying attachment for lawn mowers of the type including a rearwardly and upwardly inclined, elongated handle, said attachment comprising a tank for receiving a fluid to be sprayed, brackets fixed to said tank, a horizontal tube fixedly mounted on said brackets transversely beneath the tank and communicating therewith for receiving the fluid therefrom, said tube having discharge orifices in the upper portion only thereof, and means for non-rotatably suspending the tank from the handle for forward, rearward and lateral swinging movement, said means including a clamp mounted on the handle, a rod depending from said clamp, a peripherally grooved, vertical segment affixed to said rod in side-abutting engagement therewith, and an upstanding bail fixed on the top portion of the tank and operable in said segment.

4. A fluid spraying attachment for lawn mowers of the type including a rearwardly and upwardly inclined, elongated handle, said attachment comprising a tank for receiving a fluid to be sprayed, brackets fixed to said tank, a horizontal tube fixedly mounted on said brackets transversely beneath the tank and communicating therewith for receiving the fluid therefrom, said tube having discharge orifices in the upper portion only thereof, and means for non-rotatably suspending the tank from the handle for forward, rearward and lateral swinging movement, said means comprising a clamp including a pair of spaced, opposed upper and lower bars secured together with the handle therebetween, a rod affixed to the lower bar and depending therefrom, a peripherally grooved, vertical segment affixed to said rod in side-abutting engagement therewith, and an upstanding yoke on the tank engageable in the segment from one side thereof for operation therein.

References Cited in the file of this patent

UNITED STATES PATENTS

| | | |
|---|---|---|
| 299,038 | Tower | May 20, 1884 |
| 466,633 | Stevens | Jan. 5, 1892 |
| 1,139,204 | Mathews | May 11, 1915 |
| 2,326,739 | Andrews | Aug. 17, 1943 |
| 2,658,322 | Sullivan | Nov. 10, 1953 |